United States Patent
Roe et al.

(10) Patent No.: US 9,200,339 B2
(45) Date of Patent: Dec. 1, 2015

(54) DIRECT REDUCTION OF IRON (DRI) PELLET TREATMENTS

(71) Applicant: ChemTreat, Inc., Glen Allen, VA (US)

(72) Inventors: Donald C. Roe, Jamison, PA (US);
Joseph Hamnik, Saraland, AL (US);
James Wilkins, North Chesterfield, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 150 days.

(21) Appl. No.: 14/189,282

(22) Filed: Feb. 25, 2014

(65) Prior Publication Data

US 2014/0238194 A1 Aug. 28, 2014

Related U.S. Application Data

(60) Provisional application No. 61/770,377, filed on Feb. 28, 2013.

(51) Int. Cl.
*C21B 13/00* (2006.01)
*B05D 7/00* (2006.01)

(52) U.S. Cl.
CPC .............. *C21B 13/0093* (2013.01); *B05D 7/00* (2013.01); *C21B 13/008* (2013.01)

(58) Field of Classification Search
CPC ..... C21B 13/0093; C21B 13/008; B05D 7/00
See application file for complete search history.

(56) References Cited

U.S. PATENT DOCUMENTS

| 4,076,520 A | 2/1978 | Pietsch |
| 4,388,116 A | 6/1983 | Carrillo-Cantu et al. |
| 2008/0175771 A1* | 7/2008 | Egberink ............ C22B 1/00 423/1 |
| 2012/0220502 A1* | 8/2012 | Jurgenson ............ C09K 8/38 507/135 |

FOREIGN PATENT DOCUMENTS

| DE | 2 026 328 | 12/1971 |
| DE | 2 309 625 | 8/1974 |
| GB | 2 129 708 A | 5/1984 |

OTHER PUBLICATIONS

Feb. 11, 2015 International Preliminary Report on Patentability issued in International Application No. PCT/US2014/018266.
Jun. 24, 2014 International Search Report and Written Opinion issued in International Application No. PCT/US2014/018266.

* cited by examiner

*Primary Examiner* — George Wyszomierski
*Assistant Examiner* — Tima M McGurthry Banks
(74) *Attorney, Agent, or Firm* — Oliff PLC

(57) ABSTRACT

An aspect provides a method of treating direct reduced iron (DRI) pellets, by applying a foam to the DRI pellets. The foam may include a foam having an expansion ratio of about 20-40 and a bubble size of about 200 microns or less. The foam may include one or more additives, such as anti-corrosion agent(s), oxidizing agents, and dust reducing binder(s). The foam(s) may be applied in a single stage or in multiple stages and may be applied to hot or cold DRI pellets. Other aspects are described and claimed.

17 Claims, 2 Drawing Sheets

DIRECT REDUCTION OF IRON (DRI) PELLET TREATMENTS

CLAIM FOR PRIORITY

This application claims the benefit of prior U.S. Provisional Patent Application Ser. No. 61/770,377, entitled "DIRECT REDUCTION OF IRON (DRI) PELLET TREATMENTS", filed on Feb. 28, 2013, the contents of which are incorporated by reference in their entirety herein.

BACKGROUND

Direct reduced iron (DRI) (also referred to herein generally as "DRI pellets" and also known as sponge iron) is produced from iron ore (e.g., in the form of pellets) that is reduced directly (e.g., by a reducing gas). The reducing gas may be a mixture of hydrogen ($H_2$) and carbon monoxide (CO). Direct reduction of iron is thus a process (DRI process or processes) of directly reducing the iron ore in solid form by a reducing gas.

DRI processes have significant issues downstream of the reduction zone including at least: 1) the pellets are extremely reactive to oxygen, resulting in self-heating and the resultant potential for fires and, 2) the dry pellets are extremely dusty during transport and handling; and 3) the pellets oxidize (corrode) rapidly when exposed to moisture, further resulting in self-heating and the potential for fires.

BRIEF SUMMARY

One aspect provides a method of treating direct reduced iron (DRI) pellets, comprising applying a foam to the DRI pellets. The method may include applying a foam having an expansion ratio of about 20-40 and a bubble size of about 200 microns or less. The foam may include a foaming agent selected from the group consisting of the sodium, potassium, and ammonium salts of alkyl aryl sulfates and/or sulfonates, such as sodium lauryl sulfate (SLS), sodium lauryl ether sulfate (SLES), sodium C14-16 alpha olefin sulfonate and sodium dodecylbenze sulfonate. The foam may include at least one surfactant selected from the group of cationic and anionic surfactants. At least one surfactant may be a surfactant with corrosion inhibition properties. The corrosion inhibition surfactant may be a steel corrosion inhibitor surfactant. The foam may include a binder. The binder may be selected from the group consisting of a hydrophobic film binder, an anionic polymer binder, and a cationic polymer binder.

The foam may include an oxidizing agent. The oxidizing agent may include water incorporated in the aqueous foam. The foam may include an additional oxidizing agent.

The foam may be applied to the DRI pellets in a single stage or in multiple stages. The multiple stages may include a first stage wherein a first foam is applied to the DRI pellets. The first foam may include a foaming agent and a passivating treatment to oxidize the DRI pellets. The multiple stages may include a second stage wherein a second foam is applied to the DRI pellets after the first foam. The second foam may include a foaming agent, a binding agent, and may or may not include an oxidizing agent.

The foam may be applied to DRI pellets when they are hot (e.g., having a temperature of about 40 C to about 50 C). The foam may be applied to DRI pellets when they have cooled to ambient temperature (e.g., having a temperature of less than about 40 C-50 C).

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
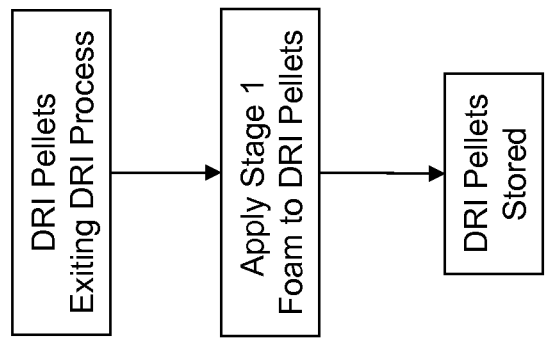
FIG. 1 illustrates an example one stage foam application to DRI pellets.

It will be readily understood that the components of the embodiments, as generally described and illustrated in the figures herein, may be arranged and designed in a wide variety of different configurations in addition to the described example embodiments. Thus, the following more detailed description of the example embodiments is not intended to limit the scope of the claims, but is merely representative of example embodiments.

Reference throughout this specification to "embodiment (s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Embodiments address issues of the reactivity of direct reduced iron (hereinafter "DRI pellets") to oxygen and moisture. The reactivity of the DRI pellets may result in rapid oxidation and self-heating (an exothermic reaction), the loss of metallic iron and, importantly, the potential risk of fire. Embodiments also address the extreme dustiness of DRI pellets when they are dry.

An embodiment provides for using dry, aqueous foams. For the purpose of this description, a dry, aqueous foam (also referred to herein simply as "foam") is defined as a foam with an expansion ratio of about 20-40 and a bubble size of about 200 microns or less. By definition, the foam will be stable and have a slow drainage rate, or long half-life. The foam can be used to uniformly treat (coat) the surfaces of DRI pellets with very little moisture, which is beneficial when treating a substrate that is highly reactive to moisture. A foam may include additives. Examples of foam additives include but are not necessarily limited to one or more foaming agents, one or more corrosion inhibitors, and one or more binding agents. Thus, within the foam matrix, chemical additives may be incorporated to achieve the different goals, as further described herein.

An embodiment provides a foam having a foaming agent. The foaming agent may be any of a number of commercially available high foaming anionic or cationic surfactants; however, for the purpose of the description, the foaming agent may also include surfactants specifically designed to minimize oxidation (corrosion) of steel. Examples of foaming agents specifically designed to minimize oxidation (corrosion) are steel corrosion inhibitors used for protecting steel from fresh water, brines, or sea water. Examples of foaming agents are the sodium, potassium, and ammonium salts of alkyl aryl sulfates and sulfonates, such as sodium lauryl sulfate (SLS), sodium lauryl ether sulfate (SLES), sodium C14-16 alpha olefin sulfonate(SAOS) and sodium dodecylbenze sulfonate (SDDBS.)

Steel corrosion inhibition is particularly useful for DRI pellets that are shipped by sea and potentially exposed to sea water. Sea water will rapidly oxidize DRI pellets resulting in potential ship fires. Other foaming agents, such as high foaming cationic surfactants would achieve the same goal. One such foaming agent is commercially available under the trade name of CAT-FOAM.

An embodiment provides a foam having a binding agent. A binding agent may be incorporated into the foam to provide long-term (residual) dust control after the foam has collapsed, coated the pellets, and the pellets become dry. Because the pellets will typically be treated when they are hot (e.g., about 40-50 C), the foam will collapse rapidly, and the pellets will be dry quickly (e.g., within minutes). The binding agent will reduce dusting of the dry pellets during subsequent storage and handling.

Binding agents that coat the pellets with a hydrophobic film, such as animal, vegetable, mineral and synthetic oils are effective, particularly when combined with a foaming agent that displays steel corrosion inhibition properties. Moreover, applying such hydrophobic film(s) in a foam matrix having corrosion inhibition properties will result in a significant reduction the amount of oil required to effectively coat DRI pellets.

A more cost-effective method includes the use of an anionic or a cationic polymer binding agent(s). Polymers should be effective at inhibiting oxidation (corrosion) of the metal, thereby providing both of oxidation inhibition and dust suppression. Anionic polymer corrosion inhibitors conventionally have not been used as dust suppressants. However, high molecular weight anionic polymers provide dust suppression when applied to DRI pellets. Cationic polymers likewise may be used as dust suppressants and corrosion inhibitors when used for treating DRI pellets.

An embodiment provides a foam including an oxidizing (passivation) agent. Coating the surface of the freshly reduced DRI pellets (e.g., at a temperature of about 40-50 C) with moisture from the aqueous foam will rapidly oxidize and passivate the surfaces and capillaries of the DRI pellets. It is further possible to include an oxidizing agent in the foam, such as oxidizing gases, e.g., oxygen and ozone in the gas phase of the foam, or water soluble liquid or solid oxidizing agents, e.g., hydrogen peroxide and potassium permanganate for further passivation of the DRI pellets. Essentially any gas phase or liquid phase oxidizing agent would be beneficial in promoting passivation when incorporated into the foam matrix. In this event, a separate step of passivation may be employed, whereby an aqueous foam containing an oxidizing agent is applied to the DRI pellets first, e.g., in the lower furnace section or furnace discharge, followed by a second application of an aqueous foam containing the foaming and/or binding agents designed to prevent oxidation/corrosion, and to reduce dusting potential.

In an embodiment, a foam may include a gas phase. The foam may include a gas such as ambient/atmospheric air, an oxidizing gas, a reducing gas, an inert gas, or some combination of the forgoing. For example, in addition to or in lieu of the oxidizing gas additive described herein, an inert gas (e.g., nitrogen) and/or reducing gases (e.g., carbon monoxide and hydrogen) may be added to the foam.

It should be noted that the embodiments described herein are not limited to treating hot DRI pellets immediately downstream of the reduction process. These principles can also be applied to cold DRI pellets during storage and handling (e.g., at various points in transit). Therefore, the same principles of dust suppression for dry DRI pellets and corrosion (oxidation) inhibition for wet pellets provided by the various embodiments may be equally applied to cold DRI pellets. For example, cold pellets may be treated prior to shipping and handling and/or on receiving pellets prior to storage and handling.

Figure 2:
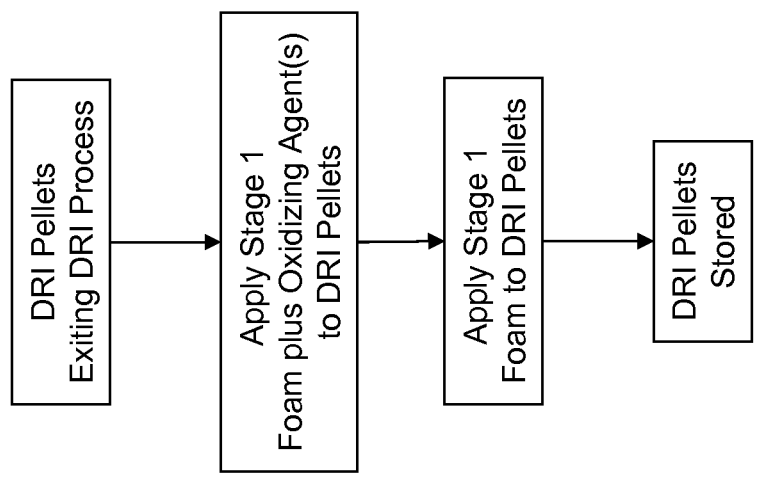
FIG. 2 illustrates an example two stage foam application to DRI pellets.

Referring generally to FIG. 1 and FIG. 2, embodiments therefore provide methods for the treatment of DRI pellets using foams as described herein. Using a dry, aqueous foam, effective passivation (using oxidizing agents if water alone is not sufficient or does not provide the desired amount of passivation), corrosion (oxidation) inhibition, and dust suppression is achieved by incorporating anionic and/or cationic foaming agents, anionic and/or cationic polymers, and oxidizing (passivating) agents (if needed or desirable) for treating the DRI pellets. This results in a significant improvement in the prior art of DRI pellet production, storage, shipping and handling. These principals can also be applied to cold (ambient) DRI pellets during subsequent storage, handling and shipping processes.

An example method is the application of a dry, aqueous foam with an expansion ratio of about 20-40 and a bubble size of about <200 microns to DRI pellets. The foam may be applied in one or two stages in the lower furnace section and/or immediately downstream of the furnace discharge.

In the example case of a single-stage application, the foam may be comprised of an anionic or cationic foaming agent, and an anionic or cationic polymer. The anionic foaming agent may be, for example, sodium lauryl sulfate, or any anionic foaming agent with steel corrosion inhibition properties. The cationic foaming agent may be, for example, any high foaming cationic surfactant with steel corrosion inhibition properties. Most cationic surfactants would conform to this requirement. The anionic polymer may be, for example, any high molecular weight anionic polymer with steel corrosion inhibition properties. The cationic polymer would be any high molecular weight polymer with steel corrosion inhibition properties. Most cationic polymers exhibit suitable properties necessary for this purpose.

In the example case of a two-stage process, the first stage may include treatment with any dry, aqueous foam (as described herein) using traditional foaming agents, e.g., the sodium salt of C14-C16 alpha olefin sulfonate. Optionally, an oxidizing agent may be added to the first stage foam. The purpose of the first stage foam would be instant passivation. The second stage may be comprised of a foam conforming to the single-stage process described above.

In either of the example cases described herein, a method according to an embodiment results in the instant passivation of the DRI pellet surfaces and capillaries at the furnace discharge, as well as the protection of the DRI pellets against further oxidation (corrosion) when the pellets are wet, and a reduction in relative dusting potential when the pellets are dry.

In the example case of cold DRI pellets (e.g., ambient temperature DRI pellets), passivation of the DRI pellets would not be required as they would already have been passivated with ambient oxygen during storage. Therefore, corrosion inhibition (for wet pellets) and dust suppression (for dry pellets) may be the primary goals in the treatment of cold DRI pellets. Alternative embodiments may include changes in the example methods of application and the example foam chemical constituents.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the specification there has been set forth example embodiments and, although specific terms are used, the description thus given uses terminology in a generic and descriptive sense only and not for purposes of limitation.

Finally, any numerical parameters set forth in the specification and claim(s) are approximations (for example, by using the term "about") that may vary depending upon the desired properties sought to be obtained by the embodiment(s). At the very least, each numerical parameter should at least be construed in light of the number of significant digits and by applying ordinary rounding.

What is claimed is:

1. A method of treating direct reduced iron (DRI) pellets, comprising applying a foam to the DRI pellets,
   wherein the foam has an expansion ratio of about 20-40 and a bubble size of about 200 microns or less, and
   wherein the foam includes a foaming agent selected from the group consisting of sodium, potassium, and ammonium salts of alkyl aryl sulfates and sulfonates.

2. The method of claim 1, wherein the foaming agent is selected from the group consisting of sodium lauryl sulfate, sodium lauryl ether sulfate, sodium C14-16 alpha olefin sulfonate and sodium dodecylbenze sulfonate.

3. The method of claim 1, wherein the foam further comprises at least one surfactant selected from the group consisting of a cationic surfactant and an anionic surfactant.

4. The method of claim 3, wherein the at least one surfactant is a corrosion inhibition surfactant.

5. The method of claim 4, wherein the corrosion inhibition surfactant is a steel corrosion inhibition surfactant.

6. The method of claim 1, wherein the foam further comprises a binder.

7. The method of claim 6, wherein the binder is selected from the group consisting of a hydrophobic film binder, an anionic polymer binder, and a cationic polymer binder.

8. The method of claim 1, wherein the foam further comprises an oxidizing agent.

9. The method of claim 8, wherein the oxidizing agent comprises water.

10. The method of claim 9, wherein the foam further comprises an additional oxidizing agent.

11. The method of claim 1, wherein applying a foam to the DRI pellets comprises applying the foam to the DRI pellets in a single stage.

12. The method of claim 1, wherein applying of a foam to the DRI pellets comprises applying the foam to the DRI pellets in multiple stages.

13. The method of claim 12, wherein the multiple stages comprise a first stage wherein a first foam is applied to the DRI pellets.

14. The method of claim 13, wherein the first foam comprises a passivating treatment oxidizing the DRI pellets.

15. The method of claim 14, wherein the multiple stages comprise a second stage wherein a second foam is applied to the DRI pellets after the first foam.

16. The method of claim 1, wherein the foam is applied to DRI pellets having a temperature of about 40° C. to about 50° C.

17. The method of claim 1, wherein the foam is applied to DRI pellets having a temperature of less than about 50° C.

* * * * *